CHARACTER PRINTER UTILIZING A ROPE MEMORY

Filed Sept. 7, 1965 Sheet 1 of 3

Inventors
JOSEPH P. MORAN
ROBERT CZAJKOWSKI
By Mueller, Aichele & Rauner
Attys.

Inventors
JOSEPH P. MORAN
ROBERT CZAJKOWSKI
By Mueller, Aichele & Rauner
Attys.

CHARACTER PRINTER UTILIZING A ROPE MEMORY

Filed Sept. 7, 1965

Inventors
JOSEPH P. MORAN
ROBERT CZAJKOWSKI
By Mueller, Aichele & Rauner
Attys.

United States Patent Office 3,419,887
Patented Dec. 31, 1968

3,419,887
CHARACTER PRINTER UTILIZING A ROPE MEMORY

Joseph P. Moran, Chicago, and Robert Czajkowski, Wood Dale, Ill., assignors to Motorola, Inc., Franklin Park, Ill., a corporation of Illinois Filed Sept. 7, 1965, Ser. No. 485,273
8 Claims. (Cl. 346—74)

This invention relates to a data processing system and more particularly to an electrical system for producing electric signals for reproducing characters on the recording sheet of a teleprinter.

In a teleprinter of the general type in which scanning electrodes form characters on the recording sheet by electrical impulses applied to the scanning electrodes, each character is reproduced by a plurality of dots produced in localized areas of the point contacts of the scanning electrodes. The known electrical systems for such a teleprinter become very complicated when the speed of data processing increases. Because the coded character information of the data source has to be prepared so that the different columns of dots are printed one after another, storage devices and logic circuits are used in order to provide the right sequence of electrical pulses to produce the character. The storage devices and logic circuits become more expensive as the printing speed of the teleprinter is raised to a higher value.

Accordingly, it is an object of the present invention to provide an improved and inexpensive data processing system.

Another object of the invention is to provide a data processing system with memory circuitry used both to perform logic and for storing information.

A further object of the invention is to provide an input circuit for the data processing system with high noise immunity.

A feature of the invention is the provision of a data processing system using a rope memory and having input circuits for the rope memory each including a resistor in series with a tunnel diode which initially conducts relatively large current in response to the data signal and then at a lower current level when the data signal has been applied, to thereby provide a threshold action with respect to applied signals.

A further feature is the provision of a data processing system for use with a printer providing characters formed by rows and columns of dots and including a rope memory having sense lines in combination with sense gates, each sense gate having a transformer combining a plurality of the sense lines into a group for each row of the dot pattern, and each gate being actuated for each column of the pattern.

A further feature is the provision of pulse stretcher stages with an AND function which are rendered conductive only when a short pulse from the rope memory and a long pulse from a print pulse stage are simultaneously applied, and which are held conducting by either pulse and are nonconductive when both pulses disappear.

The invention is illustrated in the drawings in which.

In brief, the present invention may be utilized advantageously for a data processing system for generating electric signals representing characters and which are applied to reproduce characters on the recording sheet of a teleprinter. The coded data information of a data source is applied to as many line receivers as data bits are used. The line receiver circuit makes use of the increasing and decreasing portion of the characteristic of a tunnel diode, which is connected with a series resistor in a voltage divider circuit to the input of the line receiver. Thus, the level of noise immunity can be varied by varying the value of the resistor. Each of the outputs of the line receivers are coupled to a flip-flop for providing direct and complementary signals as input signals for a rope memory. The output signals of the rope memory are supplied through sense lines to sense gates. In the sense gates both ends of the sense line are combined into groups of five through one pulse transformer, thus generating a row output. Each of the five combined outputs can be looked at selectively by use of the column gating arrangement. Thus, for each input character, the data information is fed into the rope as many times as there are columns. Since all dots for a given row terminate in the same pulse transformer, the following circuit consisting of a differential amplifier, a pulse stretcher and an output signal amplifier can be used in common for one row. The rope memory signal, about 1 microsecond in width, is transmitted through the differential amplifier into the pulse stretcher. At the same time a print pulse signal of about 200 microseconds in width is applied from the timing stage to the pulse stretcher to generate a signal of the duration required for applying current to the scanning electrodes.

Figure 1:
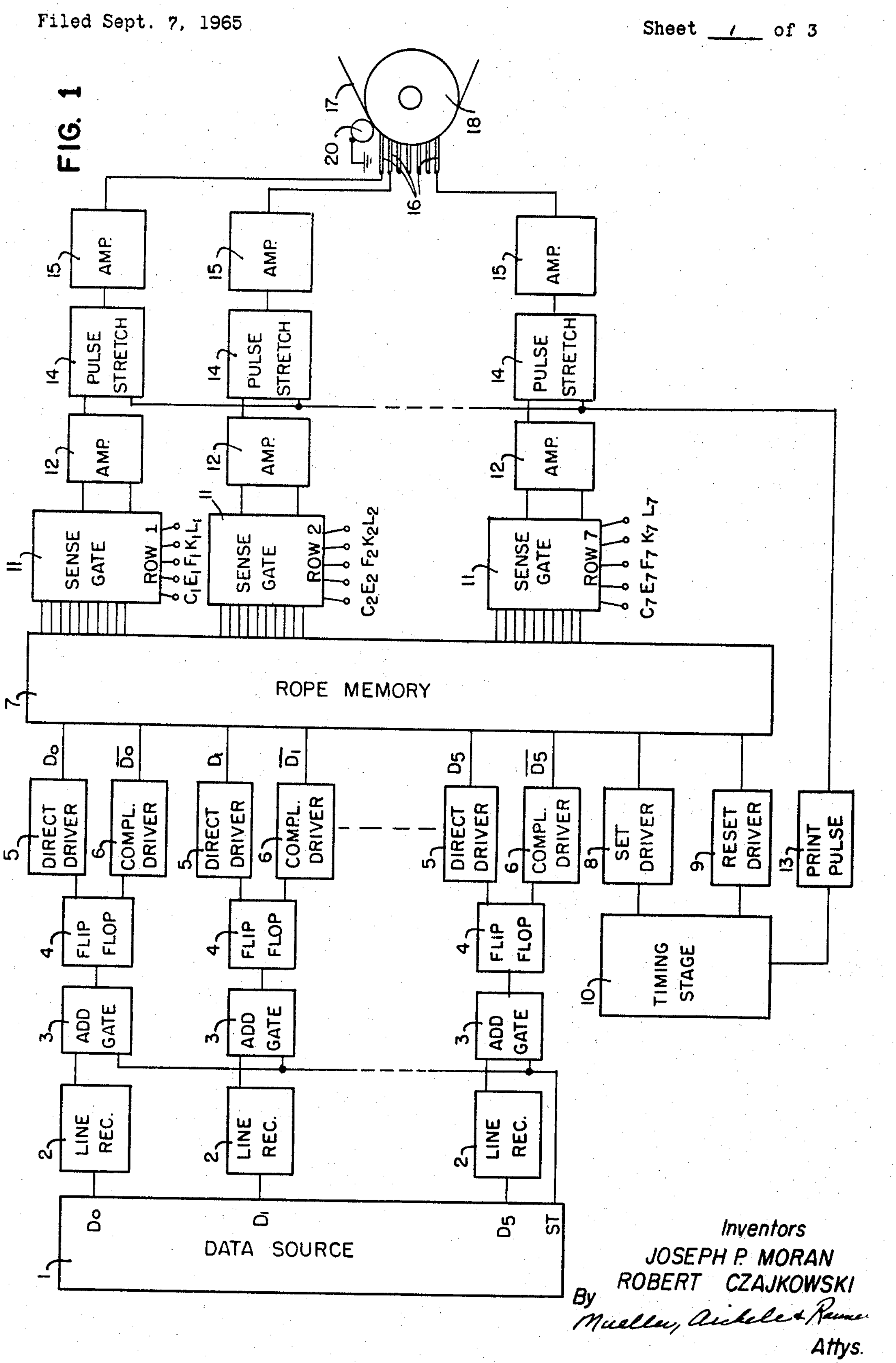
FIG. 1 is a block diagram of a data processing system of the present invention.

Referring now particularly to the drawings, in FIG. 1 there is shown a block diagram of a preferred embodiment of a data processing system according to the invention. In the described system, a data source 1 supplies simultaneously various data bits D0, D1 through D5 into line receivers 2, each associated with one data bit. The data bits are coded as required for the characters to be printed, in the described system a binary code is used. The line receiver outputs go into AND gates 3, to which is added a strobe pulse ST which is generated by the data source. Each AND gate 3 drives a flip-flop 4 in which the data bits are processed to provide a direct and a complement signal. These signals are transmitted through direct drivers 5 and complement drivers 6 respectively into the rope memory 7, the structure and function of which will be described with the description of FIG. 2. The direct and complement drivers (5 and 6) generate current flow through the intricate rope pattern of the memory so that the appropirate core is selected. The selection is performed by a set signal from set driver 8 and a reset signal from reset driver 9, which are timed by a timing stage 10.

The outputs of the rope memory 7 are applied to sense gates 11 which combine the outputs for the various rows into groups equal to the number of columns in each character. According to the pattern of the characters (see FIG. 5) there are seven rows and five columns. Because each sense gate 11 comprises gates for dots in the five columns, seven sense gates 11 are used. Each sense gate terminates into a differential amplifier 12 and the outputs of the differential amplifiers are connected to pulse stretchers 14. The pulse stretcher is a gate which is opened by the signal of the differential amplifier and the print pulse gate and closed by the signal of the print pulse stage 13 in order to generate dots in the printer having a duration of around 200 microseconds. Following the pulse stretcher there are further signal amplifiers 15 to generate an appropriate signal level for the printer. The output of these amplifiers are connected to the scanning electrodes 16, which scan along the surface of a recording sheet 17 driven by a roller 18. The electrical signals are conducted through the recording sheet 17 to a roller 20 which is electrically grounded.

Figures 2, 5:
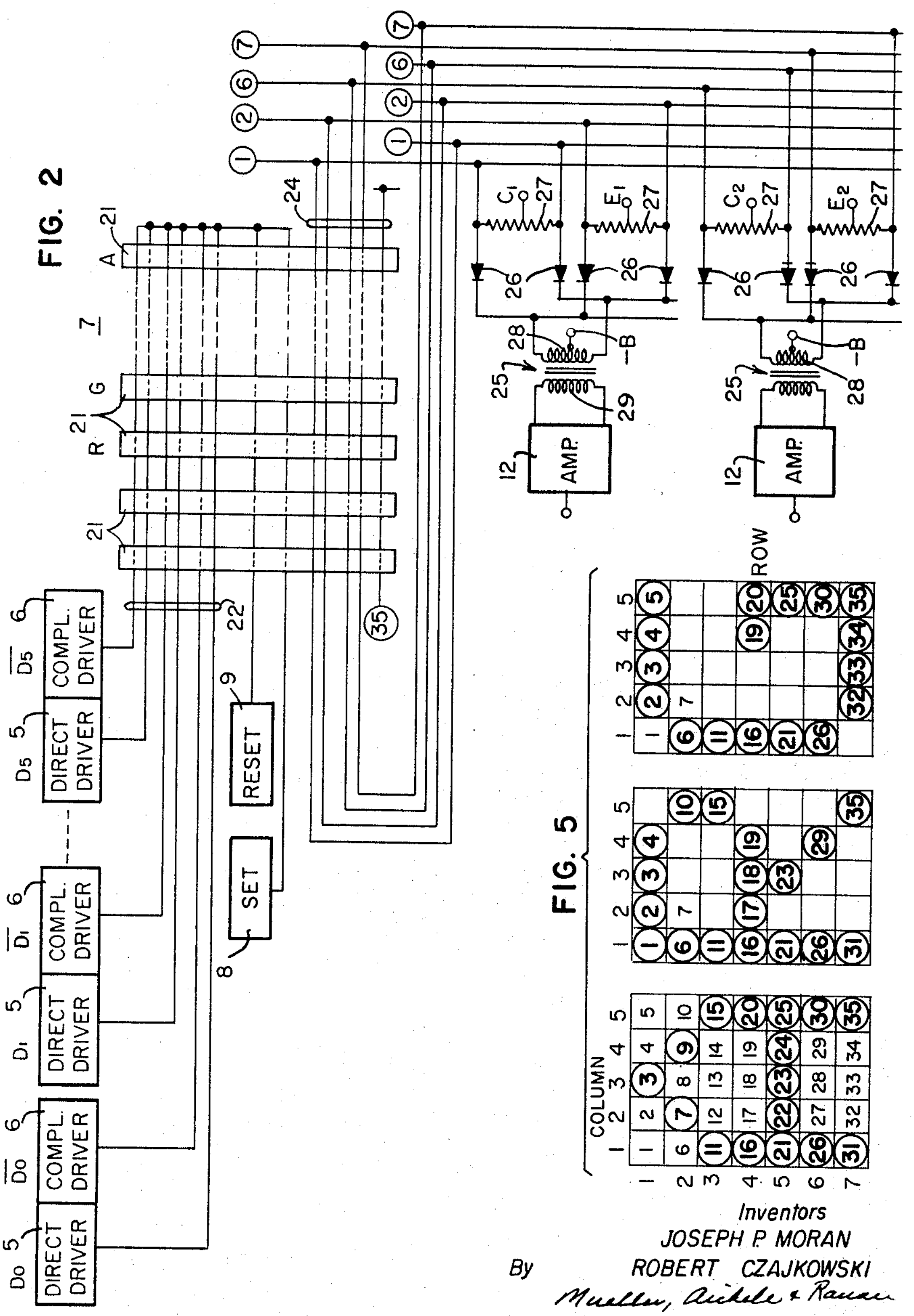
FIG. 2 is a schematic circuit of a rope memory and sense gates which form part of the processing system.
FIG. 5 shows the dot pattern for three characters.

As shown in FIG. 2, the rope memory 7 consists of a multiple of cores 21. Because it must be possible to select each core uniquely, each core is threaded by a selected set of inhibit lines 22 which are connected to the direct drivers 5 and complement drivers 6. All cores 21 are also threaded by a common set line and reset line connected to the set driver 8 and the reset driver 9. The outputs of the memory are applied via the sense lines 24 to the sense gates 11, the selection circuitry required for row 1 and row 2 being shown. The sense gates will be described more particularly later on referring to FIG. 3.

For purpose of selection of each core uniquely, each core is threaded by such direct inhibit lines which correspond to a "0" and by such complement inhibit lines which correspond to a "1" of the binary coded data signal which identifies a predetermined character, and which is coordinated with a given core. Each of the direct inhibit drivers stores the address of the core to be selected, and each of the complement inhibit drivers stores the complement address of the core. The set line is enabled simultaneously with the inhibit lines, and because the set pulse is of equal amplitude to the inhibit pulses, but of opposite polarity, it switches only that core fully which is not threaded by any of the enabled inhibit lines. The reset pulse is also of the same amplitude as the set pulse and inhibit pulses. The polarity is such that it will reset the core that was set during the selection pulse of the rope memory operating cycle. During the read phase the core output obtained as a consequence of the application of the reset pulse is used to generate the pattern of a given character. The pattern of the given character is generated by threading sense lines through the particular core which is enabled by the set line corresponding to the dots which are needed for printing the given character. All the other sense lines bypass the particular core.

As illustrated in FIG. 5 the characters consist of a selected set of dots in a 35 dot matrix pattern. Therefore, each sense line belonging to a dot required by a predetermined character has to be threaded through the core for that character, and this core is selected by the data bits for the predetermined character.

Figures 3, 4:
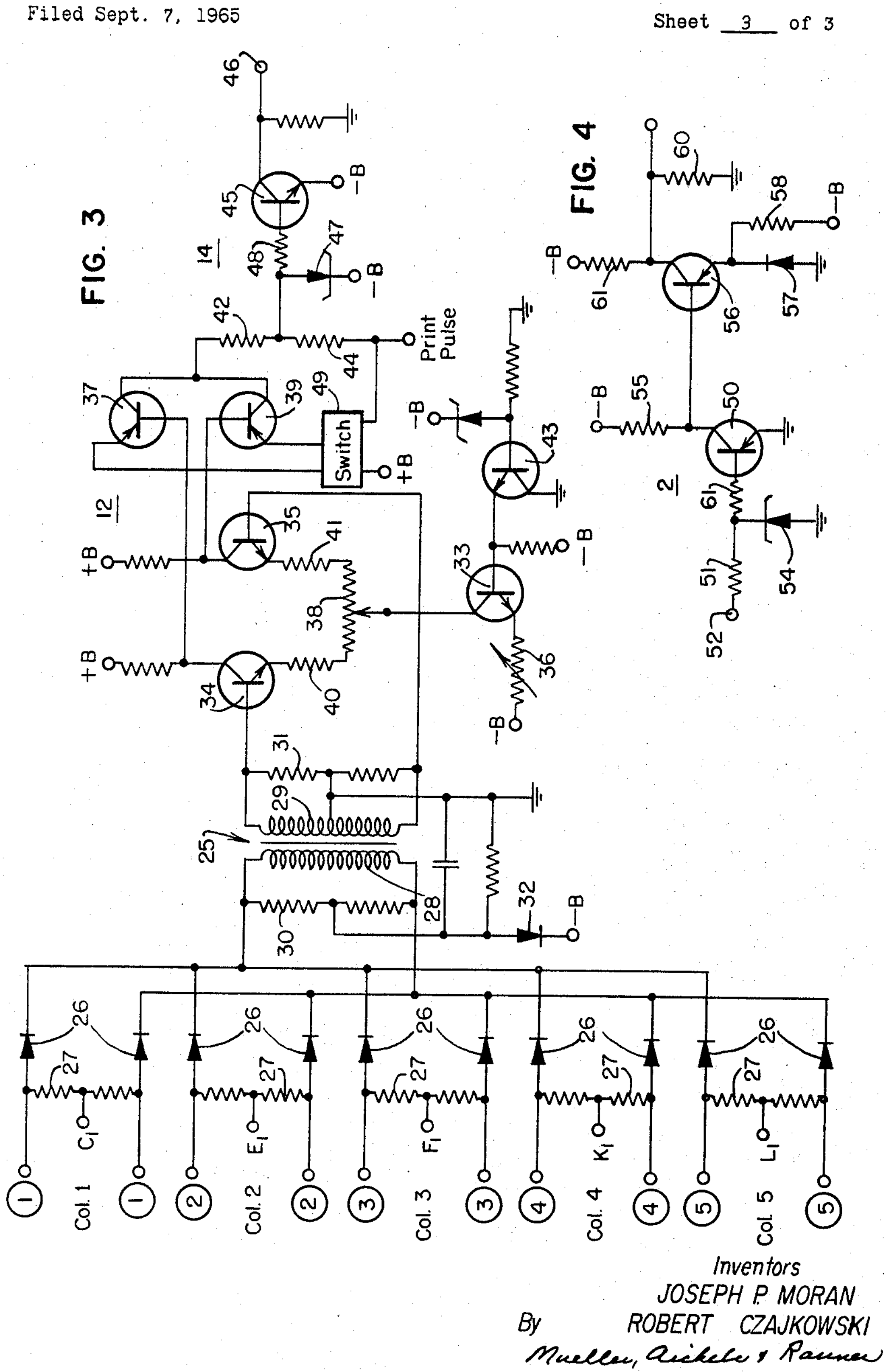
FIG. 3 is a schematic circuit of one sense gate terminating through a differential amplifier into a pulse stretcher.
FIG. 4 is a schematic circuit of a line receiver.

As shown in FIG. 2, both ends of each sense line 24 are brought out of the rope memory 7. These ends are combined into groups of five through a pulse transformer 25, thus generating row outputs for one row. In FIG. 3 there is shown more particularly the sense gate for one row together with the differential amplifier 12, the pulse stretcher 14 and the signal amplifier 15. The sense lines are marked in the drawings with surrounding numbers. Each end of the sense line is terminated in a diode 26. Resistors 27 connected to the two ends of the sense line are of the same value and have relatively small resistance to match impedances. Each center tap of the resistors 27 is terminated in a terminal $C_1$, $E_1$, $F_1$, $K_1$ or $C_2$, $E_2$ etc. respectively which are connected to a bias source. The diodes 26 are combined in such a way that one end of each sense line is coupled to one end of winding 28 of the transformer 25, and the other end of each sense line is coupled to the other end of the winding 28 of the transformer 25. Resistors 30 and 31 are connected in parallel with the windings 28 and 29 respectively of the transformer 25. The center tap of resistor 30 is connected through a diode 32 to a negative voltage supply, whereas the center tap of resistor 31 is connected to the center tap of winding 29 and to ground potential.

The various row outputs from the transformers 25 are applied to the differential amplifier comprising transistors 34 and 35. There are two basic controls for the differential amplifier. One is a variable resistor 36 connected to the negative voltage supply which adjusts the overall level of the collectors of the differential amplifier. This adjustment is necessary for the various output levels to discriminate between the zero and the one pulse, so that the output transistors 37, 39 are not driven into saturation with the highest level output from the rope memory. The second control is represented by a potentiometer 38 connected between the two emitter resistors 40 and 41. The potentiometer is used as a balance so that the two collectors of the differential amplifier have the same potential, thus eliminating the need for using a matched pair of transistors. The two collector outputs from the differential amplifier terminate into the output transistors 37, 39 which essentially represent an OR circuit. The emitter of transistors 37 and 39 are connected to a switching circuit 49 which is driven by the output of the print pulse stage 13. Either one of the two output transistors, when they turn on, will present an output at resistor 42. The emitters of the two transistors 37, 39 are positive biased at such a level that you achieve essentially the zero and one discrimination because a zero will not overcome this bias, whereas a one will overcome the bias. A transistor 33 is connected in series between resistors 36 and 38. The current through transistor 33 is regulated by a circuitry comprising transistor 43.

The pulse stretcher 14 comprises resistor 44 and a tunnel diode 47. At the input of transistor 45 the short signal of about 1 microsecond in width from the rope memory is added to the signal of about 200 microseconds in width from the print pulse circuit 13 (FIG. 1) so that an output on terminal 46 is offered which is long enough to generate the dot pattern on the recording sheet. The addition takes place when the current through the resistor 42 and resistor 44 fires the tunnel diode 47. The current through either one of these resistors in itself is not adequate to cause the tunnel diode to fire, both currents being required to do this. Once the tunnel diode 47 is fired, however, either one of the two signals can disappear as the sustaining current is only half of the current required to fire the diode initially. As long as the tunnel diode 47 is fired the transistor 45 conducts providing an output signal. A resistor 48 is connected between the tunnel diode 47 and the transistor 45. It acts as a buffer under high temperature condition and prevents immediate turn-off after ½ the turn-on current is removed.

The circuitry of the line receiver 2 is more particularly shown in FIG. 4. It comprises a transistor 50 whose base is connected through a resistor 61 and a resistor 51 to the input terminal. A tunnel diode 54 is connected between the base and ground potential in such a way that it becomes conductive, when a negative pulse is applied to the terminal 52. The emitter of the transistor 50 is also connected to the ground potential, whereas the collector is connected through resistor 55 to the negative voltage supply and also to the base of a further transistor 56. The emitter of transistor 56 is connected through a diode 57 to ground potential and through resistor 58 to the negative voltage supply, and the collector is connected through resistor 60 to ground potential and through resistor 61 to the negative voltage supply.

The line receiver circuit makes use of the increasing and decreasing portion of the characteristic of a tunnel diode. The circuit is designed so that an input pulse from the data source, if it is of a voltage level which will cause the tunnel diode to work at the increasing portion of the characteristic, will turn on the transistor 50 and generate an output, which then fires the second grounded emitter transistor 56. The threshold level can be set by varying the value of the series resistor 51, since a larger resistance has a higher voltage drop, as long as the current through the tunnel diode corresponds to the increasing portion of the characteristic. When the signal overcomes the threshold value, most of the signal is applied to the base of the transistor, because the current through the tunnel diode and the simultaneous voltage drop across the series resistor decreases so that most of the input signal is available at the base.

The function of the rope memory and the sense gates now will be described more particularly referring to FIGS. 2 and 5. As already described each core 21 is threaded by a selected set of inhibit lines 22 and sense lines 24 characterizing the given character coordinated with this core. Both ends of the sense line are brought out of the memory and are terminated in a pair of diodes 26 belonging to the sense gate. A group of five sense lines are combined by the transformer providing one row. Because the 35 dot matrix pattern (FIG. 5) uses a 7 x 5 array, there are 7 sense gates for 7 rows, each including 5 diode gates for the five columns. Therefore, the binary coded data signal has to be fed into the rope as many times as there are columns, i.e., 5 times. Each time, one column is looked at through the sequence of all five columns. Because the pattern of a given character is generated by threading as many sense lines through the corresponding core enabled by the set line as dots are needed for printing the given character, and because all the other sense lines bypass the selected core, the sense lines of the given character are energized each time the data signal is fed into the rope memory. As long as the bias voltage at the terminals $C_1$, $E_1$, $F_1$, $K_1$, $L_1$ and at the terminals $C_2$, $E_2$, etc. of the corresponding sense gates of the other rows are negative, the diodes 26 are cutoff and no signal will reach the transformer 25. However, if all seven terminals allied to column 1, e.g., terminals $C_1$ and $C_2$ are shown in FIG. 2, are positive, a signal is transferred to the transformers and thus to the scanning electrodes through all sense gates which correspond to a dot position of the given character of column 1. For all the other dots of rows 2 to 7 and columns 2 to 5 the selection and energizing of the scanning electrodes takes place respectively.

What is claimed is:

1. A high speed data processing system for generating electrical impulses derived from coded information and applied to a plurality of scanning electrodes for producing characters on a recording sheet by a plurality of dots arranged in rows and columns and with the selective presence of dots forming predetermined characters, such system including in combination, a rope memory having a plurality of inhibit registers corresponding to the bits of coded information and a plurality of sense lines corresponding to the dots in the pattern of the character, a plurality of input circuits including line receivers each coupled to one of said inhibit registers, gate means coupled to said sense lines and combining said sense lines corresponding to the dots in each row into a group and providing a group for each row of a character, said gate means including output means for each group, and pulse amplifier and shaper means coupling each output means to one of said scanning electrodes.

2. A high speed data processing system for generating electrical impulses derived from coded information and applied to a plurality of scanning electrodes for producing characters on a recording sheet by a plurality of dots arranged in rows and columns and with the selective presence of dots forming predetermined characters, such system including in combination, a rope memory having a plurality of inhibit registers corresponding to the bits of coded information and a plurality of sense lines corresponding to the dots in the pattern of the characters, a plurality of input circuits including line receivers each coupled to one of said inhibit registers and applying a pulse thereto in response to an input signal of a predetermined level, gate means coupled to said sense lines and combining said sense lines corresponding to the dots in each row into a group and providing a group for each row of a character, said gate means including output means for each group, and pulse amplifier and shaper means coupling each output means to one of said scanning electrodes.

3. A high speed data processing system for generating electrical impulses derived from coded information and applied to a plurality of scanning electrodes for producing characters on a recording sheet by a plurality of dots arranged in rows and columns and with the presence of dots forming predetermined characters, such system including in combination, a rope memory having a plurality of inhibit registers corresponding to the bits of coded information and a plurality of sense lines corresponding to the dots in the pattern of the character, a plurality of input circuits including line receivers each coupled to one of said inhibit registers, gate means coupled to said sense lines and combining said sense lines corresponding to the dots in each row into a group and providing a group for each row of a character, said gate means including output means for each group, means coupled to said gate means for all rows for causing said gate means to simultaneously produce pulses for all the rows of each column, and pulse amplifier and shaper means coupling each output means to one of said scanning electrodes.

4. A high speed data processing system for generating electrical impulses derived from coded information and applied to a plurality of scanning electrodes for producing characters on a recording sheet by a plurality of dots arranged in rows and columns and with the selective presence of dots forming predetermined characters, such system including in combination, a rope memory having a plurality of inhibit registers corresponding to the bits of coded information and a plurality of sense lines corresponding to the dots in the pattern of the character, a plurality of input circuits including line receivers each coupled to one of said inhibit registers and applying a pulse thereto in response to an input signal of a predetermined level gate means coupled to said sense lines and combining said sense lines corresponding to the dots in each row into a group and providing a group for each row of a character, transformer and first amplifier means, each said group coupled through said transformer means to said amplifier means, pulse stretcher and second amplifier means coupled between said first amplifier means and the scanning electrodes.

5. A high speed data processing system for generating electrical impulses derived from coded information and applied to a plurality of scanning electrodes for producing characters on a recording sheet by a plurality of dots arranged in rows and columns and with the selective presence of dots forming predetermined characters, such system including in combination a rope memory having a plurality of inhibit registers corresponding to the bits of coded information and a plurality of sense lines corresponding to the dots in the pattern of the character, a plurality of input circuits including line receivers each coupled to one of said inhibit registers and applying a pulse thereto in response to an input signal of a predetermined level, diode means connected to each end of the sense lines and resistor means having center taps connected across the ends of each sense line, said center taps connected to a first bias source, transformer means having primary and secondary windings, said primary windings connected through said diode means to said sense lines combining said sense lines corresponding to the dots in each row into a group and providing a group for each row of a character, said primary windings having center taps connected to a second bias source rendering the diodes nonconductive, first amplifier means, said secondary windings connected to said first amplifier means respectively, pulse stretcher and second amplifier means coupled between said first amplifier means and the scanning electrodes, which scanning electrodes are energized when the coded information determining a given character is fed into the rope memory as many times as there are columns generating signals in sense lines corresponding to the given character and being transferred to the scanning electrodes, when successively for one column after the other the diodes of each row are rendered conductive by a bias voltage of said first bias source, which is opposite to the bias voltage of said second bias source.

6. A high speed data processing system for generating electrical impulses derived from a coded information and applied to a plurality of scanning electrodes for producing characters on a recording sheet by a plurality of dots arranged in rows and columns and with the selective presence of dots forming predetermined characters, such system including in combination a rope memory having as many inhibit registers as bits corresponding to the coded information and as many sense lines as dots in the pattern of the character, input circuit means comprising line receivers each one coupled to one of said inhibit registers respectively, said line receivers including an input transistor having a base electrode, and an emitter electrode connected to a reference potential, resistor means series connected to said base electrode, a tunnel diode connected between the base electrode and said reference potential, gate means coupled to said sense lines and combining said sense lines for each row into groups equal to the amount of columns respectively, transformer and first amplifier means, each said group coupled through said transformer means to said amplifier means, pulse stretcher and second amplifier means coupled between said first amplifier means and the scanning electrodes.

7. In a high speed data processing system for generating electrical impulses derived from a coded information and applied to a plurality of scanning electrodes for producing characters on a recording sheet by a plurality of dots arranged in rows and columns and with the selective presence of dots forming predetermined characters, said system including in combination, a rope memory having as many inhibit registers as bits corresponding to the coded information and as many sense lines as dots in the pattern of the character, input circuit means comprising line receivers each one coupled to one of said inhibit register respectively, said line receivers including an input transistor having a base electrode and an emitter electrode connected to a reference potential, resistor means series connected to said base electrode, a tunnel diode connected between the base electrode and said reference potential, gate means coupled to said sense lines and combining said sense lines for each row into groups equal to the amount of columns respectively, transformer and first amplifier means, each said group coupled through said transformer means to said amplifier means, second amplifier means having input terminals, first resistor means series coupled between said first amplifier means and said input terminals respectively, a tunnel diode connected between said input terminal and a reference potential respectively, a print pulse stage and second resistor means series coupled to said input terminal respectively, said tunnel diode being conductive when both the currents through said first and second resistors are applied and being nonconductive when both said currents disappear to provide print signals of predetermined widths at the scanning electrodes.

8. A high speed data processing system for generating electrical impulses derived from a coded information and applied to a plurality of scanning electrodes for producing characters on a recording sheet by a plurality of dots arranged in rows and columns and with the selective presence of dots forming predetermined characters, such system including in combination, a rope memory having as many inhibit registers as bits corresponding to the coded information and as many sense lines as dots in the pattern of the character, input circuit means comprising line receivers each one coupled to one of said inhibit registers respectively, said line receivers including an input transistor having a base electrode and an emitter electrode connected to a reference potential, resistor means series connected to said base electrode, a tunnel diode connected between the base electrode and said reference potential, diode means connected to each end of the sense lines and resistor means having center taps connected across the ends of each sense line, said center taps connected to a first bias source, transformer means having primary and secondary windings, said primary windings connected through said diode means to said sense lines combining said sense lines of each row into groups equal to the amount of columns, said primary windings having center taps connected to a second bias source rendering the diodes nonconductive, first amplifier means, said secondary windings connected to said first amplifier means respectively, pulse stretcher and second amplifier means coupled between said first amplifier means and the scanning electrodes, which scanning electrodes are energized when the coded information determining a given character is fed into the rope memory as many times as there are columns generating signals in sense lines corresponding to the given character and being transferred to the scanning electrode, when successively for one column after the other the diodes of each row is rendered conductive by a bias voltage of said first bias source, which is opposite to the bias voltage of said second bias source.

References Cited

UNITED STATES PATENTS 3,109,166 10/1963 Kronenberg -------- 340—166
3,249,923 5/1966 Simshauser --------- 340—347
3,286,029 11/1966 Simshauser ---------- 178—30

OTHER REFERENCES

Daniel Clemson and Peter Kuttner, Applications of Rope Memory Devices; August 1964, Computer Design, pp. 15, 16, 18.

BERNARD KONICK, *Primary Examiner.*

L. J. SCROEDER, *Assistant Examiner.*

U.S. Cl. X.R.

178—30; 197—1; 340—347